Jan. 2, 1934.  C. J. AMOS  1,941,777
INDICATOR MAP
Filed April 18, 1931  2 Sheets-Sheet 1
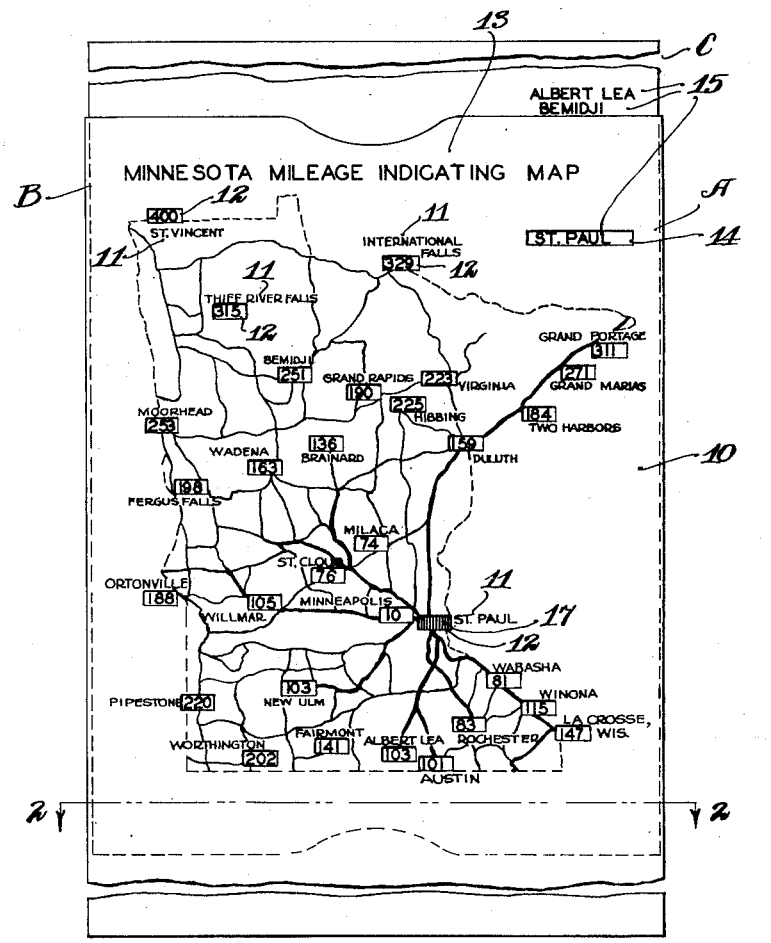
Fig. 1
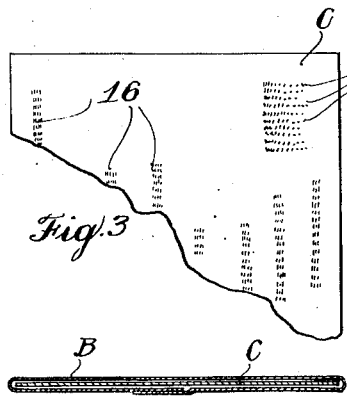
Fig. 3
Fig. 2
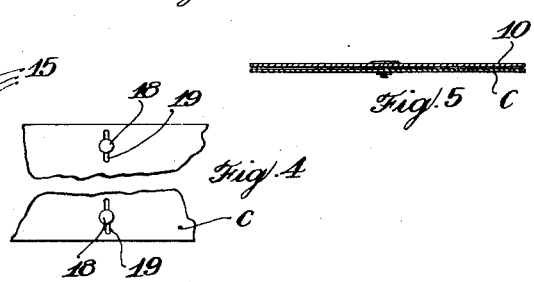
Fig. 4
Fig. 5
Inventor
Clifford J. Amos
By Howard Piercher
Attorney Jan. 2, 1934.  C. J. AMOS  1,941,777
INDICATOR MAP
Filed April 18, 1931   2 Sheets-Sheet 2
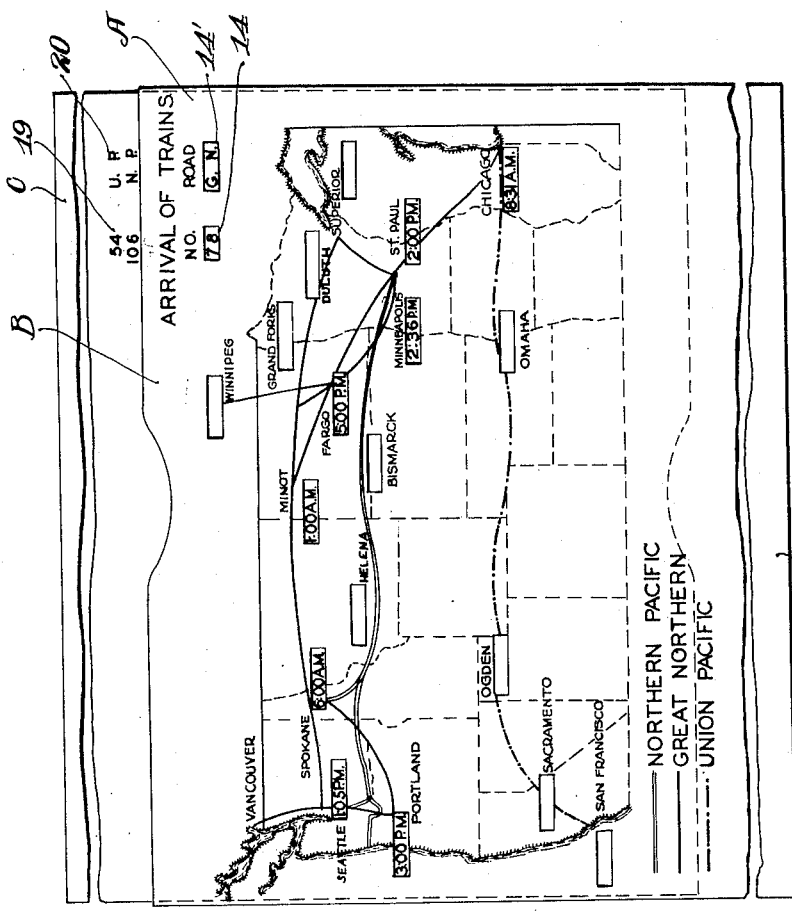
Inventor
Clifford J. Amos
By Howard Zieler
Attorney Patented Jan. 2, 1934

1,941,777

UNITED STATES PATENT OFFICE 1,941,777

INDICATOR MAP

Clifford J. Amos, St. Paul, Minn., assignor of one-half to Jerome J. Crowley, St. Paul, Minn.

Application April 18, 1931. Serial No. 531,233

8 Claims. (Cl. 35—6)

My invention relates to a mileage indicator and time chart which is particularly adapted to be used in conjunction with a map of certain territories or states to indicate at a glance the mileage from a certain given city to all other cities in the territory or states illustrated, and the device is equally well adapted to indicate the time of arrival of certain trains at certain stations as indicated on the map or chart.

A feature resides in a mileage indicating map wherein a certain state or territory may be illustrated on the face of the same and which indicates the principal cities at and along the automobile highways, together with a window opening at each city indicated, so that by means of a particular window located at one side of the map the name of a particular city may be selected to appear through this last window so that all the other windows will display the mileage from the city appearing in the window to the other cities throughout the state, territory, or country illustrated by the map.

It is a feature to provide a mileage indicating map for automobiles or for trains, so that the mileage may be indicated from one city to another. In automobile maps it is very desirable for tourists to be provided with a map of the character I have developed which will quickly indicate to the autoist or traveler the mileage from one city to other cities indicated by the map. The indicating device may include a folder or envelope in which a slidable card may be carried having the names of the different cities and towns thereon, as well as indicating indicia to show the mileage. By operating the card in the envelope or folder inside of the map the mileage desired from certain points will be quickly indicated. This provides a ready means of reference for the autoist whereby he may be able to tell virtually at a glance the distance from any city to any other city appearing upon the map or chart.

It is a feature to provide an indicator having a map to indicate individual states as well as surrounding territory to the individual states, or a series of states, or a map of a whole territory, and to provide a window through which the mileage or indicating indicia may appear adjacent each principal city appearing on the map. A separate window is provided for displaying the name of the particular city from which it is desired to determine the miles to other cities by railroad and/or automobile highways. The city which appears in the separate window will also appear upon the map or chart and the space in the window at this city on the map will be indicated in color so that the operator of the map may tell at a glance that the mileage indicated in all the other windows at the respective cities is from this city where the color appears through the window. This gives the operator a material advantage in reading the map quickly and I find that a map of this character is very desirable for tourists as well as being applicable to indicate the time of arrival of trains at certain cities. The map may be applied to other uses of a similar character with the same advantages.

As many cards as may be desired may be inserted in the envelope of the map so that a large number of cities may be indicated and the various indicia may appear in the window adjacent each city.

Heretofore maps have been provided for indicating mileage and cities, however, they have not had a means of ready reference to indicate the mileage from different cities to each of the other cities, or to indicate the mileage from one city to each of the other cities in the territory indicated, but it has been necessary with the old type of indicating road maps and the like for the tourist to figure out the mileage by adding it up separately from point to point rather than giving at a glance as I have accomplished in this mileage indicating map, the mileage from one city to another in the territory or states indicated.

These features, together with other details and objects will be more fully and clearly hereinafter set forth.

In the drawings forming part of this specification:

Figure 1 is a front view of my mileage indicating map as it would appear in use for the State of Minnesota and adjoining states.

Figure 2 is a sectional view on the line 2—2 of Figure 1.

Figure 3 is a detail of a portion of one of the indicating cards used in my map.

Figure 4 is a detail of another form of attaching the card to the indicating map.

Figure 5 is an edge view of Figure 4.

Figure 6 illustrates another form of the indicating map as applied to railway stations and states or territories.

The mileage indicating map A may be in the form illustrated in Figure 1, where the principal indication upon the map is a single state and in this case the State of Minnesota is used as an example of any particular state which might be selected to be used in the indicating map A.

The indicating map A is provided with display surfaces 10 on either side so that the map of one state may be indicated on one side, and the map of another state may be indicated on the other side if it is desired, or one display surface such as 10 of the indicating map A may be used as the front to display a map like the State of Minnesota in Figure 1, and the other surface on the other side may be used as the back of the map A and upon which advertising may be printed or indicated or any other suitable display may be applied thereto.

The map A is designed to indicate a state or territory and on the display surface 10 it will be noted that in the outline of the state of Minnesota, the principal highways are indicated which lead from the respective cities such as 11. Adjacent these cities I provide an open window 12 through which indicia may appear to indicate mileage as will be more fully hereinafter pointed out. Across the top of the map A I provide indicia such as 13 which may indicate the title of the map, such as "Minnesota mileage indicating map", or any other title to designate the territory covered by the map may be applied as a title indicia for the map A.

In a suitable place on the display sheet 10, such as in the upper right hand side or in any other suitable place on the map A, a window 14 is provided which is adapted to display a city or town through the same. This window 14 is for the purpose of displaying any city or town on the map A from which it is desired to determine the mileage to any other city or town appearing upon the map A.

Within the envelope B which forms the display faces 10 on either side thereof, an indicating card C is slidably supported, and upon this card the cities or towns 15, or such other indicia as may be desirable to display through the window opening 14, are printed in column form one below the other so that when the card C is operated in the envelope B the respective cities or towns 15 will be displayed through the opening 14 as they register with the same. In line with each window opening 12, columns of figures or indicia 16 are provided on the card C so that when the card C is moved to register a certain city through the window opening 14, the figures in the columns 16 will be displayed through the window openings 12. The card C may be provided with indiciating indicia such as the column of cities, like 15, and the column of figures like 16, so that both sides of the card C may be employed to indicate through the openings 12 and 14 or such other openings as may be provided, to complete an indicating device like the map A for the purpose of indicating the mileage from a particular city to other cities appearing upon the map A, or for such other purposes as will be hereinafter set forth. The card C is provided with colored spaces or surfaces 17 so as to readily attract the eye, like the color red, or other suitable color, when the colored spaces register with any of the windows 12.

In Figure 1, the map A has been set to indicate the city "St. Paul" appearing through the window 14. Then the window 12 adjacent the city St. Paul appearing at the proper place upon the map of Minnesota, will indicate the colored space 17 through the same so as to indicate to the operator of the map A that the map is set into indicating position to show the mileage from the city of St. Paul to any of the other cities or towns appearing on the map which are provided with a window 12. Thus, for example, "Minneapolis" would appear as ten miles from "St. Paul". "St. Cloud" would appear as seventy-six miles from "St. Paul", or "Thief River Falls" would appear as three hundred and fifteen miles from "St. Paul", and "International Falls" would appear as three hundred and twenty-nine miles from "St. Paul". In the same manner the operator of the map A may see at a glance just how far any of the respective cities are from the city of "St. Paul" when the map is set as indicated in Figure 1. The operation of the map is simple and by placing any one of the cities appearing in the column 15 to register with the opening or window 14, the map will readily indicate the distance from the particular city showing through the window 14 to all the other cities throughout the entire state or territory illustrated on the display surface 10 of the map A.

If it is desired, both sides of the card C may be used for the cities, such as 15, and for the columns such as 16. When both sides of the card C are used, one display surface such as 10 may be used of the device A, or both sides may be used so that another state map may be indicated in enlarged outline like in Figure 1 on the other display face which would be the opposite side to the face 10 appearing in Figure 1. It is also apparent that several cards such as C may be used in the same envelope like B, or similar thereto, so that the desired indications may be accomplished in accordance with the principles of the indicator A as herein set forth and as will be more fully hereinafter defined.

The card C may be held by rivets such as 18, operating in slots 19, like as is illustrated in small detail in Figures 4 and 5, so that the slidable card C may be operated in relation to the display face 10 of the indicator A without the necessity of the envelope structure like B.

In Figure 6 I have illustrated my indicator as employed to be operated to show a series of railroads extending through a series of states on the display face 10 and adjacent the principal cities or towns through which the railroads pass, I provide the indicating windows 12. In this construction the envelope B is formed with two display windows 14 and 14' positioned adjacent each other. The window 14 may indicate the number of a particular train by the column of numbers 19 which appears upon the card C, while the window 14' may indicate the particular train in abbreviation, such as "N. P." for "Northern Pacific", "U. P." for "Union Pacific", "G. N." for "Great Northern", etc., which will appear upon the card C. In this form of the indicator A, a series of columns of figures or indicia is provided to coincide with the windows 12 adjacent each city or town to indicate the time of arrival of the particular train which is indicated through the windows 14 and 14'. In this manner I have illustrated a method which may be employed in the use of my indicating map A in conjunction with railroad trains to indicate the different times of arrival of the trains at different cities.

The indicating map A will be of primary importance to tourists and those who are traveling throughout the state or different states or territories, and where it is desirable to know the distance from one place to another. The simplicity of operation permits the user of my map to quickly determine the distance from one city to another and by a series of cards, such as C, as well as using both sides of the envelope B for indicating faces like 10, the utility of the indicating map is enlarged to a great extent as well as permitting the use of a full display side like 10 to indicate a state like "Minnesota", "Wisconsin", "Illinois", or "Iowa", in fact, any state or territory can be indicated on the display surface 10. As an advertising medium I find my map to be very practical owing to the fact that it conveys valuable information to the user and may be used for advertising purposes where it can carry an advertisement and be given away by the advertiser owing to the small cost of manufacture and production of the same.

The principles of my indicating map A may be carried out for other uses than those set forth and in accordance with the patent statutes I have endeavored to represent the best embodiment thereof. While the primary feature is for the purpose of indicating the distance from one city to another, like in the development of the indicator in Figure 1, it is apparent that the same principles may be employed for other uses and with varying construction so as to accomplish the same result and the invention should be interpreted within the scope of the following claims.

I claim:

1. An indicating map comprising, a display sheet having a map thereon to illustrate a series of towns and cities, indicating windows one adjacent each town and city, and a key indicating window, and a slidable member associated with said map having indicia thereon to indicate towns and cities through said key indicating window, and rows of figures on said slidable member adapted to indicate miles through said windows at each town and city whereby said indicating map will indicate the number of miles from the city or town shown in said key indicating window to all of the other cities and towns having windows associated therewith.

2. A mileage indicating map including, a series of indicating windows one adjacent each town or city designated in said map, a key window adapted to indicate any of said cities or towns appearing on said map through said key window, and a card slidable indicator having blank spaces and having numbers to indicate miles adapted to show through the windows at the cities and towns and the cities to be indicated through said key window being positioned on said slidable card so that a city may be selected to appear through said key window by sliding said card whereby the window adjacent the selected city on the map will appear blank and the numbers indicating the miles on said slidable card will automatically appear at the respective other cities and towns to indicate the number of miles from the city or town appearing through said key window.

3. An indicating device incuding, a display member, a map formed on said display member, a series of open individual windows formed in said map one adjacent each name of various places indicated on said map, a key window in said display member, a member slidably associated with said display member, and having indicia thereon adapted to appear through said individual windows for each place designated on said map and indicia adapted to appear through said key window whereby when certain indicia are set to appear through the key window other indicia will appear through the individual windows at the different points which are corelated with the indica indicated through the key window to provide an indicating display.

4. A mileage indicating map including, a display face adapted to indicate a certain territory, a series of cities indicated on said map having a display window adjacent each of said cities, a key window adapted to indicate any one of the cities appearing on said map, and means for indicating the city selected through said key window and to simultaneously indicate the number of miles the city indicated in the key window is from all of the other cities through said windows adjacent each city.

5. A mileage indicator map including a display face adapted to indicate a certain territory, a series of cities indicated on said map and having a display window adjacent each of the same, a key window adapted to indicate any one of the cities appearing on said map, and means for displaying a distinguishing color at a selected city on said map corresponding to the name of the city appearing at the key window and to simultaneously indicate at all of the windows adjacent the other cities on the map, numerals to indicate the miles from the city displayed by the distinguishing color.

6. A railroad time of arrival indicating map including a display face illustrating a certain territory, a series of railroad routes indicated on said face and stopping points along said routes, said map having a display opening adjacent each stopping point for indicating train arrival times, said map also having a key window through which the particular railroad name and train number will be simultaneously displayed and the arrival time will be displayed at each stopping point display opening along the route and a slidable member associated with said map visible through said display openings and key window, bearing said arrival time and train name and number.

7. A device of the class described including, a sheet having a map delineated thereon, said sheet being provided with an index opening and openings adjacent the city indications on the map, a second relatively movable sheet having delineated thereon columnar data including the names of a plurality of cities within the regional scope of the map and a corresponding number of series of numbers indicating distances, the names of the cities being selectively rendered visible through said index opening to thereby bring a corresponding series of numbers into registration with said map openings whereby to indicate the distance between the selected city and those appearing on the map.

8. A mileage-indicating device comprisng two superposable sheets, the upper sheet bearing a map and having apertures adjacent to respective predetermined geographic localities on said map, the lower sheet bearing groups of notations so positioned that one group at a time may be caused to show simultaneously through said apertures, the notations so showing at any one time signifying the mileages of the respective localities from one of said localities as a base; the upper sheet having also a special aperture, and the lower sheet bearing a group of special notations adapted to show one at a time through said special aperture, a different special notation showing through said special aperture simultaneously with the showing of a corresponding group of said mileage-indicating notations, each special notation being a key to the base locality referred to by the corresponding group of mileage-indicating notations.

CLIFFORD J. AMOS.